United States Patent Office 3,485,840
Patented Dec. 23, 1969

3,485,840
2,4-DIAMINO - 5 - (2',4',5'-SUBSTITUTED BENZYL) PYRIMIDINES, INTERMEDIATES AND PROCESSES
Max Hoffer, Nutley, N.J., assignor to Hoffmann-La Roche Inc., Nutley, N.J., a corporation of New Jersey
No Drawing. Continuation-in-part of application Ser. No. 410,710, Nov. 12, 1964. This application May 7, 1965, Ser. No. 454,172
Int. Cl. C07d 51/42; A61k 27/00
U.S. Cl. 260—251                                20 Claims

ABSTRACT OF THE DISCLOSURE 2,4-diamino-5-(2',4',5'-substituted benzyl) - pyrimidines, prepared, inter alia, from the corresponding 2,4-dihalo-5-(2',4',5'-substituted benzyl)-pyrimidines, are described. The end products are useful as potentiators of sulfa drugs.

CROSS-REFERENCE TO RELATED APPLICATIONS

This application is a continuation-in-part of U.S. Patent application Ser. No. 410,710, filed Nov. 12, 1964, now abandoned.

This invention relates to novel processes for the preparation of pyrimidine compounds, and to pyrimidine compounds prepared thereby.

More particularly, it relates to processes for the preparation of pyrimidines of the formula

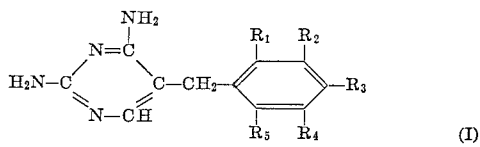

wherein $R_1$ is halogen (chlorine, bromine, or fluorine), lower alkyl, lower alkoxy, or benzyl, $R_3$ is halogen (chlorine, bromine, or fluorine), lower alkyl, or lower alkoxy, and $R_2$, $R_4$ and $R_5$ are each hydrogen, halogen (chlorine, bromine, or fluorine), lower alkyl, or lower alkoxy.

The invention also relates to novel pyrimidines of the formula

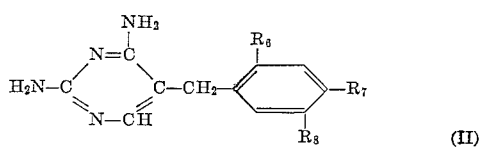

wherein $R_6$, $R_7$, and $R_8$ are halogen (chlorine, bromine, or fluorine), lower alkyl, or lower alkoxy. Also included within the scope of the invention are the acid addition salts of the pyrimidines of Formula II with pharmaceutically acceptable acids. Particularly preferred compounds of Formula II are 2,4-diamino-5-(4',5'-dimethoxy-2'-methylbenzyl)pyrimidine, 2,4-diamino-5-(4',5'-dimethoxy-2'-ethylbenzyl)pyrimidine, 2,4-diamino-5-(2',4',5'-trichlorobenzyl)pyrimidine, and 2,4-diamino-5-(2',4',5'-trimethoxybenzyl)pyrimidine, and their acid addition salts.

The terms "lower alkyl" and the lower alkyl portion of the term "lower alkoxy" are to be understood to refer to straight and branched chain alkyl groups having from 1 to 7 carbon atoms, e.g., methyl, ethyl, propyl, isopropyl, butyl, hexyl, heptyl, etc.

The invention further relates to novel intermediates for the preparation of the compounds of Formula II.

The compounds of Formula I prepared by the processes of the invention are useful as antibacterial agents, particularly for topical applications. The novel compounds of Formula II are useful in combination with the antibacterial sulfa drugs, e.g., sulfisoxazole, sulfamethoxazole, sulfadimethoxine, sulfaquinoxaline, etc., as antibacterial agents. The addition of a compound of Formula II to one of the above sulfonamides results in a marked potentiation of the antibacterial activity of the sulfonamide. A typical adult human dosage would be, for example, 0.5 g. of sulfisoxazole and 100 mg. of a compound of Formula II in a unit dosage form, e.g., tablet, capsule, aqueous suspension, troché, etc., for example, with the usual pharmaceutical excipients known to the drug compounding art.

2,4 - diamino - 5 - (4',5' - dimethoxy - 2' - methylbenzyl)pyrimidine, 2,4 - diamino - 5 - (4',5' - dimethoxy-2' - ethylbenzyl)pyrimidine, 2,4 - diamino - 5(2',4',5'-trichlorobenzyl)pyrimidine, and 2,4 - diamino - 5 -(2',4', 5' - trimethoxybenzyl)pyrimidine when used in combination with a sulfonamide, e.g., sulfisoxazole, exhibit a surprising potentiation of activity against important pathogenic organisms. For example, 2,4 - diamino - 5 - (4',5'-dimethoxy - 2' - methylbenzyl)pyrimidine and 2,4 - diamino - 5 - (2',4',5' - trimethoxybenzyl)pyrimidine markedly potentiate the activity of sulfonamides against clinical strains of Staphylococcus aureus, which are known to be quite difficult to control. Similar combinations containing other compounds of Formula II do not exhibit this surprising potentiation of activity against clinical strains of Staphylococcus aureus. Additionally, 2,4 - diamino-5 - (4',5' - dimethoxy - 2' - methylbenzyl)pyrimidine and 2,4 - diamino - 5 - (2',4',5' - trichlorobenzyl) - pyrimidine exhibit a surprisingly high degree of activity against E. coli, pneumococci, and proteus vulgaris. Furthermore, 2,4-diamino - 5 - (4',5' - dimethoxy - 2' - methylbenzyl)pyrimidine, 2,4 - diamino - 5 - (4',5' - dimethoxy - 2' - ethylbenzyl)pyrimidine, and 2,4 - diamino - 5 - (2',4',5' - trimethoxybenzyl)pyrimidine markedly potentiate the anticoccidiosis activity of active sulfonamide, e.g., sulfadimethoxine, sulfaquinoxaline, and sulfamethoxazole. For example, a composition comprising a poultry comestible such as a feedstuff, and 0.0125 percent sulfadimethoxine and 0.0125 percent 2,4 - diamino - 5 - (2',4',5' - trimethoxybenzyl)pyrimidine, 2,4 - diamino - 5 - 4',5' - dimethoxy - 2' - methylbenzyl)pyrimidine, or 2,4 - diamino-5 - (4',5' - dimethoxy - 2' - ethylbenzyl)pyrimidine fed to poultry ad libitum prevents the occurrence of E. tenella outbreaks in the poultry. Another important and surprising advantage in employing these three compounds in combination with antibacterial sulfonamides such as sulfadimethoxine is the fact that these combinations are highly active not only against coccidiosis, but also against a wide range of fowl bacterial infections, a virtue not usually possessed by the prior art compounds and compositions employed in the treatment of coccidiosis in poultry. The advantages of being able to employ a single composition for use against a wide range of poultry infections is obvious. Furthermore, 2,4 - diamino - 5 - (2',4',5' - trimethoxybenzyl)pyrimidine, 2,4 - diamino - 5 - (4',5' - dimethoxy - 2' - methylbenzyl)pyrimidine, and 2,4 - diamino - 5 - (4',5' - dimethoxy - 2' - ethylbenzyl)pyrimidine are useful alone in preventing and treating coccidiosis in poultry. For example, employed alone at a dosage of, e.g., 0.025 percent in feedstuff which is fed to poultry ad libitum, they successfully prevent coccidiosis, whereas other compounds of Formula II are inactive against coccidiosis at this dosage level.

Accordingly, 2,4 - diamino - 5 - (4',5' - dimethoxy-2'-methylbenzyl) - pyrimidine, 2,4 - diamino - 5 - (4',5'-dimethoxy - 2' - ethylbenzyl) - pyrimidine, 2,4 - diamino-5 - (2',4',5' - trichlorobenzyl)pyrimidine, and 2,4 - diamino - 5 - (2',4',5' - trimethoxybenzyl)pyrimidine are highly preferred for use in the practice of the invention and are not to be considered as equivalent to the other compounds of Formula II.

One of the novel processes of the invention is carried out according to the following reaction scheme:

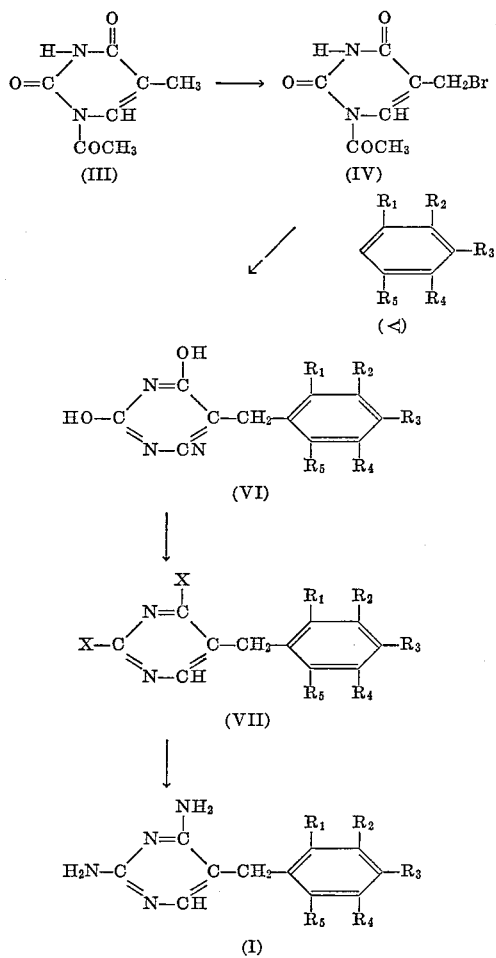

wherein $R_1$ through $R_5$ have the meaning given above, and X is chlorine or bromine.

In the above reaction scheme acetylthymine (III) is reacted with N - bromosuccinimide to form acetylbromothymine (1 - acetyl - 2,4 - diamino - 5 - bromomethyl-1,2,3,4 - tetrahydropyrimidine) (IV). Acetylbromothymine is reacted with compound (V) to form a compound of Formula VI. The compound of Formula VI is then reacted with a halogenating agent, either a chlorinating agent or a brominating agent, to form a compound of Formula VII. Compound (VII) is treated with ammonia to form a compound of Formula I.

In the first step of the above reaction, i.e., the reaction of acetylthymine (III) to acetylbromothymine (IV) is carried out in an alcohol-free organic solvent, preferably a halogenated hydrocarbon solvent, e.g., chloroform, carbon tetrachloride, tetrachloroethane, etc., and preferably in the presence of a catalyst, e.g., an organic peroxide catalyst such as benzoyl peroxide.

The reaction of compound (IV) with compound (V) is carried out in the presence of a mercuric or zinc halide, e.g., mercuric or zinc chloride, bromide, or fluoride, or in the presence of aluminum chloride. However, when compound (V) contains one or more lower alkoxy groups, aluminum chloride should not be employed since aluminum chloride may result in the saponification of the lower alkoxy groups. The reaction product is a complex of the compound of Formula VI and the mercuric halide, zinc halide, or aluminum chloride. This complex is broken by treatment with a strong base, e.g., an alkali metal hydroxide such as sodium hydroxide, to release the compound of Formula VI.

The reaction of compound (VI) with a halogenating agent can be carried out with any halogenating agent which converts hydroxy groups to halo groups wherein the halo groups are chlorine or bromine, such as phosphorus oxyhalide, e.g., phosphorus oxychloride; phosphorus trihalide, e.g., phosphorus trichloride; phosphorus pentahalide, e.g., phosphorus pentabromide; etc. The compound of Formula VII formed thereby is reacted with ammonia, preferably in lower alkanoic solution, e.g., methanolic ammonia, at an elevated temperature, e.g., at from about 80° to about 200°, preferably from about 100 to about 150° C. Due to the fact that these temperatures are above the boiling point of methanol, the reaction is carried out in a closed system, e.g., in an autoclave.

With respect to the novel pyrimidines of Formula II, the intermediates therefor are also novel and have the following formulae, wherein X, $R_6$, $R_7$, and $R_8$ have the meanings given above:

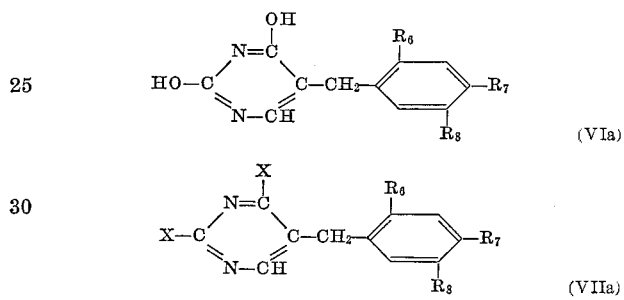

The invention will be better understood from the following examples which are given for illustration purposes.

EXAMPLE 1

Preparation of 2,4-diamino-5-(2',4',5'-trimethoxybenzyl)pyrimidine

Acetylthymine (34 g.=0.2 mole), chloroform (alcohol-free) (250 ml.), N-bromosuccinimide (39 g.=0.22 mole) and benzoyl peroxide (2 g.) were refluxed under stirring for 1 hour, resulting in a clear pale orange solution. The solution was transferred to a 1-liter beaker and chilled until crystallization began. Heptane (350 ml.) was gradually added as the crystallization proceeded. The crystals, a mixture of the product and succinimide, were filtered by suction. Separation from the latter and traces of bromosuccinimide were effected by stirring the filter cake with a solution of 10 g. of sodiumbisulfite in 400 ml. of ice cold water for 5 to 10 minutes and filtering by suction. It was washed twice on the filter, each time with 200 ml. of ice cold water, then with a little ether, and pressed as dry as possible. It was dried in a vacuum over $P_2O_5$ for 24 hours. The product, 1-acetyl-2,4-diketo-5-bromomethyl-1,2,3,4-tetrahydropyrimidine (acetylbromothymine) when recrystallized from dry benzene, melted at 168°.

To a solution of acetylbromothymine (9.88 g.=0.04 mole) and 1,3,4-trimethoxybenzene (8 g.=0.0475 mole) in nitrobenzene (20 ml.) warmed to 85–90°, there was added mercuric chloride (5.6 g.=0.02 mole). An exothermic reaction started immediately under evolution of hydrogen bromide, the temperature rose to 110° and an intense green color of a mercuric chloride complex developed. After keeping the temperature at 110° for 10 minutes, the mixture was allowed to cool. The mixture was stirred with a solution of 10 g. of sodium iodide in 25 ml. of 3 N aqueous sodium hydroxide solution in order to decompose the mercuric chloride complex of the product, extracted with ether to remove nitrobenzene and the aqueous layer neutralized with acetic acid. The product deposited crystalline and was collected by filtration through a suction funnel. To purify it, the product was suspended in 25 ml. of hot water, sodium hydroxide solution (10 ml.) was added in order to dissolve the material, the solution charcoaled, and the filtrate acidified with acetic acid, under chilling. There is obtained 5-(2',4',5'-trimethoxybenzyl)uracil as a white crystalline powder of melting point 238–239°.

21 g. (0.072 mole) of 5-(2',4',5'-trimethoxybenzyl)uracil was refluxed with phosphorus oxychloride (140 ml.) and dimethylaniline (5 ml.) for 3 hours, under stirring. The excess phosphorus oxychloride was distilled off in a vacuum from a water bath and the residue slurried with ice water. The undissolved material was extracted with ether, the ether layer washed with 1 N sodium hydroxide solution and then water. 2,4-dichloro-5-(2',4',5'-trimethoxybenzyl)pyrimidine of melting point 95–96° was obtained as white crystals after evaporation of the ether.

2,4 - dichloro-5-(2',4',5'-trimethoxybenzyl)pyrimidine (18.2 g.=0.055 mole) was autoclaved with methanolic ammonia (300 ml. saturated at 10°) at 150–160° for 6 hours. Upon allowing the solution to cool, part of the product crystallized and was collected by filtration. The filtrate was evaporated on a steam bath and the crystalline residue slurried with 50 ml. of 3 N aqueous sodium hydroxide solution. The undissolved crystals were collected by filtration. To purify the material, the combined products were dissolved in 100 ml. of hot 10 percent acetic acid, the solution charcoaled and the material precipitated by addition of an excess 20 percent aqueous sodium hydroxide solution. 2,4-diamino-5-(2',4',5'-trimethoxybenzyl)pyrimidine of melting point 213° was obtained.

EXAMPLE 2

Preparation of 2,4-diamino-5-(2',3',4'-trimethoxybenzyl) pyrimidine

Acetylthymine (34 g.=0.2 mole), chloroform (alcohol-free) (250 ml.), N-bromosuccinimide (39 g.=0.22 mole) and benzoyl peroxide (2 g.) were refluxed under stirring for 1 hr. A clear pale orange solution resulted. The solution was transferred to a 1 liter beaker and chilled to the beginning of a crystallization. Heptane (350 ml.) was gradually added as the crystallization proceeded. The crystals, a mixture of the product and succinimide, were filtered by suction. Separation from the latter and traces of bromo-succinimide were effected by stirring the filter cake with a solution of 10 g. of sodium bisulfite in 400 ml. of ice cold water for 5 to 10 min. and filtering by suction. It was washed twice on the filter, each time with 200 ml. of ice cold water, then with a little ether and pressed as dry as possible. It was dried in a vacuum over $P_2O_5$ for 24 hrs. The product of this reaction, 1-acetyl-2,4-diketo-5-bromomethyl - 1,2,3,4 - tetrahydropyrimidine (acetylbromothymine) after recrystallization from dry benzene melted at 168°.

Pyrogallol methyl ether (3.4 g.=0.02 mole), acetylbromothymine (4.94 g.=0.02 mole), nitrobenzene (10 ml.) were heated together to 90–100° and mercuric chloride (2.8 g.=0.01 mole) were added. The temperature rose spontaneously to 130° under evolution of hydrogen bromide. The resulting solution was kept at 120–130° for 5 min., and then allowed to cool. It was stirred with a solution of 10 g. of sodium iodide in 25 ml. of 3 N aqueous sodium hydroxide solution in order to decompose the mercuric chloride complex of the product, extracted with ether to remove nitrobenzene and the aqueous layer neutralized with acetic acid. The product deposited crystalline and was collected by filtration through a suction funnel. To purify it, the product was suspended in 25 ml. of hot water, sodium hydroxide solution (10 ml.) was added in order to dissolve the material, the solution charcoaled, and the filtrate acidified with acetic acid, under chilling. The product formed white plates of 244° M.P.

5-(2',3',4'-trimethoxybenzyl)uracil (4.5 g.=0.0154 mole) was refluxed with phosphorus oxychloride (30 ml.) and dimethylaniline (1 ml.) under stirring for 2 hrs. The excess phosphorus oxychloride was distilled off in a vacuum from a water bath and the residue slurried with ice water. The undissolved material was extracted with ether, the ether layer washed with 1 N sodium hydroxide solution and then water. The product, 2,4-dichloro - 5 - (2',3',4' - trimethoxybenzyl)-pyrimidine, remained as crystalline residue after evaporation of the ether and melted after recrystallization from methanol at 72–73°.

2,4-dichloro - 5 - (2',3',5'-trimethoxybenzyl)pyrimidine (15.5 g.=0.047 mole) was autoclaved with methyl alhocolic ammonia (300 ml. saturated at 10°) at 150–160° for 6 hrs. Upon allowing to cool, part of the product had crystallized and was collected by filtration. The filtrate was evaporated on a steam bath and the crystalline residue slurried with 50 ml. of 3 N aqueous sodium hydroxide solution. The undissolved crystals were collected by filtration. To purify the material, the combined products were dissolved in 100 ml. of hot 10 percent acetic acid, the solution charcoaled and the material precipitated by addition of an excess 20 percent aqueous sodium hydroxide solution. The purified product, 2,4-diamino-5-(2',3',4'-trimethoxybenzyl)pyrimidine, melted at 226–227°.

EXAMPLE 3

Preparation of 2,4-diamino-5-(2',3',4',6'-tetramethoxybenzyl)pyrimidine

Acetylbromothymine (2.47 g.=0.01 mole) prepared in Example 1, 1,2,3,5 - tetramethoxybenzene (2.5 g.=0.0125 mole), mercuric chloride (1.5 g.=0.0055 mole) and ligroin (15 ml., B.P. 90–120°) were refluxed under stirring until the HBr solution had ceased (10–15 min.). After allowing to cool, a solution of sodium iodide (5 g.) in aqueous 3 N sodium hydroxide solution was added under stirring, the aqueous layer was separated and acidified with acetic acid (3 ml.). The precipitated product was collected by suction and purified by dissolving it in warm aqueous sodium hydroxide solution, charcoaling and reprecipitation from the filtrate with acetic acid. 5-(2',3',4',6'-tetramethoxybenzyl)uracil, melting point 226–267°, is obtained thereby.

5-(2',3',4',6'-tetramethoxybenzyl)uracil (27 g.=0.084 mole), phosphorus oxychloride (108 ml.) and dimethylaniline (2 ml.) were refluxed under stirring for 3 hrs. The reaction product was isolated according to the procedure given in Example 1 to give 2,4-dichloro-5-(2',3',4',6'-tetramethoxybenzyl)pyrimidine as white crystals (from ethanol) melting at 97–98°.

2,4-dichloro-5-(2',3',4',6' - tetramethoxybenzyl)pyrimidine (21 g.=0.065 mole) was autoclaved with methanolic ammonia (300 ml. saturated at 0°) at 150–170° for 6 hrs. By working up according to the procedure given in Example 1, there is obtained 2,4-diamino-5-(2',3',4',6'-tetramethoxybenzyl)pyrimidine in white crystals melting at 256–257°.

EXAMPLE 4

Preparation of 2,4-diamino-(2',3',4',5'-tetramethoxybenzyl)pyrimidine

Acetylbromothymine (24.7 g.=0.1 mole), 1,2,3,4-tetramethoxybenzene (20 g.=0.1 mole), nitrobenzene (80 ml.) and mercuric chloride (15 g.) were stirred at 130–140° for 10 to 15 min. After allowing to cool, the reaction mixture was worked up according to the procedure given in Example 1 to furnish 5-(2',3',4',5'-tetramethoxybenzyl)uracil in the form of white crystals, which, when recrystallized from water, melted at 212–213°.

5-(2',3',4',5'-tetramethoxybenzyl)uracil (28 g.=0.087 mole), phosphorus oxychloride (119 ml.), and dimethylaniline (2 ml.), were refluxed under stirring for 3 hrs. Excess phosphorus oxychloride was distilled off in vacuo from a water bath and the residue slurried with ice water and ether. The ether layer was washed with cold dilute aqueous sodium hydroxide solution, then water and the ether evaporated. The residual oil was autoclaved with 300 ml. of methyl alcoholic ammonia (saturated at 0–10° at 150–170° for 6 hrs. and after allowing to cool, worked up according to the procedure given in Example 1 to give 2,4-diamino-5-(2',3',4',5'-trimethoxybenzyl)pyrimidine in the white crystals of melting point, 158–159°.

EXAMPLE 5

Preparation of 2,4-diamino-5-(2',4',5'-trichlorobenzyl) pyrimindine

Acetylbromothymine, prepared in Example 1, (23 g.), and 1,2,4-trichlorobenzene (230 ml.) were heated to 110°, resulting in a clear solution. Anhydrous aluminum chloride (40 g.) was added under stirring at such a rate that the temperature rose without supplying heat but did not become substantially hotter than 135° (3 to 5 minutes). Stirring was continued at 135–140° under exclusion of the moisture of the air for 45–60 minutes. The mixture was allowed to cool and the excess trichlorobenzene decanted from the aluminum chloride complex of 5-(2',4',5'-trichlorobenzyl)uracil, which had deposited on the bottom and walls of the vessel as a brownish viscous syrup. The latter was decomposed by warming and stirring with 300 ml. of 1 N aqueous hydrochloric acid and the tan colored crystalline solid formed, filtered by suction. It was purified by dissolving it in 150 ml. of 1 N hot sodium hydroxide solution and crystallization of the sodium salt by chilling the alkaline solution. 5-(2',4',5'-trichlorobenzyl)uracil was liberated from the hot aqueous solution of the sodium compound by acidifying with aqueous hydrochloric acid as a slightly water-soluble, white crystalline powder of melting point 335° dec. An analytically pure sample recrystallized from acetic acid.

5-(2',4',5'-trichlorobenzyl)uracil (4 g.), phosphorus oxychloride (32 ml.) and dimethylaniline (0.5 ml.) were refluxed under stirring for 4 hours. Excess phosphorus oxychloride was removed by vacuum distillation from a hot water bath, and the residue slurried with 50 ml. of ice water and 100 ml. of ether. The ether layer was washed successively with diluted aqueous hydrochloric acid, sodium hydroxide solution and finally water. 2,4-dichloro-5-(2',4',5' - trichlorobenzyl)pyrimidine remained, after evaporation of the ether, as a rapidly crystallizing syrup. The yield of 3.7 g. corresponded to 83 percent of the theory. A sample recrystallized for analysis from methanol melted at 92–93°.

2,4-diamino-5-(2',4',5'-trichlorobenzyl)pyrimidine was obtained by both of the following procedures:

(a) 2,4-dichloro-5-(2',4',5'-trichlorobenzyl)pyrimidine (7 g.) was autoclaved with methanol-ammonia (150 ml., saturated at 5°) at 150–160° for 5 hours. Upon allowing to cool, part of the reaction product (3 g.) crystallized. It was filtered and the filtrate evaporated. Additional product (2.7 g.) was recovered by slurrying the residue with 20 ml. of 3 N aqueous sodium hydroxide solution, filtering, washing with water, and alcohol, and drying. The yield of 5.7 g. of 2,4-diamino-5-(2',4',5'-trichlorobenzyl)pyrimidine corresponded to 92 percent of the theory.

(b) Sodium (2.64 g. =0.115 mole) was dissolved in methanol (135 ml.) and to the solution added ethoxypropionitrile (22 g.=0.223 mole) and 2,4,5-trichlorobenzaldehyde (46 g.=0.22 mole). The mixture was refluxed for 3 hours. Methanolic guanidine solution (83 ml.) with 47 percent guanidine, was added and refluxing continued under stirring for 24 hours. Crystallization of the product was completed by allowing the reaction mixture to cool to 0–5°. The crystals were filtered by suction and washed on the filter successively with 30 ml. of ethanol, 50 ml. of 3 N aqueous sodium hydroxide solution, 50 ml. of water and dried at 100°. The yield of 27 g. corresponded to 41 percent. The product proved identical with the product obtained in (a) above by its melting point and mixed melting point of 247°. A sample for analysis was recrystallized from ethylene glycol.

EXAMPLE 6

Preparation of 2,4-diamino-5-(2,4,5-trimethylbenzyl) pyrimidine

Aluminum chloride (120 g.) was suspended in pseudocumene (500 g.) and acetylbromothymine (76 g.) was added under exclusion of the moisture of the air. A reaction started at 25° under evolution of heat so that temporary cooling by immersing the vessel in cold water was necessary to avoid a rise of temperature above 60°. The mixture was kept at 60–70° for 30 minutes and then at 80–90° for an additional hour. When the evolution of HBr had ceased, the homogeneous red solution was poured on 800 g. of crushed ice plus 200 ml. of concentrated hydrochloric acid, and the excess pseudocumene steam distilled. The residue in the flask, an only slightly discolored suspension of 5-(2,4,5-trimethylbenzyl)uracil, was filtered by suction. The solid was dissolved in 600 ml. of hot 1 N aqueous sodium hydroxide solution, the solution cleared over charcoal and the filtrate acidified with 50 ml. of acetic acid. The precipitate was collected by filtration and recrystallized from acetic acid. 5-(2,4,5-trimethylbenzyl)uracil melted at 307–308°. The yield of 58 g. amounted to 78 percent of the theory.

5-(2,4,5-trimethylbenzyl)uracil (50 g.) was refluxed with phosphorus oxychloride (200 ml.) and dimethylaniline (2 ml.) for 4 hours. Excess phosphorus oxychloride was distilled off in vacuo from a hot water bath and the residue slurried with ether (500 ml.) and ice water (500 g.). The ether layer was washed with water, diluted sodium hydroxide solution and again with water and the ether evaporated. The residue was recrystallized from alcohol, yielding 48.5 g., corresponding to 84.5 percent of the theory of 2,4-dichloro-5-(2,4,5-trimethylbenzyl)pyrimidine, melting point 97–98°.

2,4-dichloro-5-(2,4,5 - trimethylbenzyl)pyrimidine (39 g.) was autoclaved with methanolic ammonia, saturated at 0° (500 ml.) at 150° for 5 hours. After allowing to cool, part of the product had crystallized from the reaction mixture (17 g.). The rest was recovered from the mother liquor by evaporation and slurrying the residue with 3 N aqueous sodium hydroxide solution (14 g.). Recrystallized from alcohol, 2,4-diamino-5-(2,4,5-trimethylbenzyl)pyrimidine formed white prisms of melting point 223°.

EXAMPLE 7

Preparation of 2,4-diamino-5-(2-methoxy-5-chloro-4,6-dimethylbenzyl)pyrimidine 4-chloro-3,5-dimethylphenol (156.5 g.=1 mole), dimethylsulfate (140 g.=1.1 mole) and methanol (200 ml.) were mixed and a solution of sodium hydroxide (44 g.) in water (90 ml.) was dropped into the mixture at 40–50° under stirring. After all the alkali had been added, it was refluxed under stirring for 30 minutes. 4-chloro-3,5-dimethylanisole was recovered by pouring into ice water, extracting with ether and vacuum distillation, boiling point 114–117°/20 mm., melting point 21°. Yield=90 percent.

4 - chloro - 3,5 - dimethylanisole (17.1 g.=0.1 mole), acetylbromothymine (24.8 g.=1.0 mole), mercuric chloride (13.5 g.=0.05 mole) and nitrobenzene (50 ml.) were gradually heated under stirring and exclusion of the moisture of the air to 60–80° when a reaction started under evolution of hydrogen bromide and heat, and all material went into solution. It was kept at 80–100° for 20 minutes, allowed to cool and the mercuric chloride complex of the product decomposed by the addition of 150 ml. of a 20 percent sodium iodide solution. The solid was filtered by suction, washed free of nitrobenzene with alcohol and ether and purified by dissolving it in 500 ml. of 1 N sodium hydroxide solution, and reprecipitation with acetic acid in the heat. The yield of 5-(5-chloro-2-methoxy-4,6-dimethylbenzyl)uracil amounted to 16.5 g. corresponding to 56 percent of the theory. Recrystallized from acetic acid, it melted at 326–327°.

5-(5-chloro-2-methoxy-4,6 - dimethylbenzyl)pyrimidine (50 g.), phosphorus oxychloride (200 ml.), and dimethylaniline (2 ml.) were refluxed under stirring for 2 hours. The excess phosphorus oxychloride was removed by vacuum distillation from a hot water bath. The crystalline residue was slurried with ice water and recovered by filtration under suction. It was slurried with 150 ml. of cold alcohol and filtered again. Recrystallized from alcohol, it melted at 162–163°. The yield of 2,4-dichloro-5-(5-chloro-2 - methoxy - 4,6 - dimethylbenzyl)pyrimidine amounted to 45 g., corresponding to 80 percent of the theory.

2,4-dichloro-5-(5 - chloro-2 - methoxy - 4,6 - dimethylbenzyl)pyrimidine (44 g.), and methanolic ammonia (500 ml., saturated at 0°) were autoclaved at 140–150° for 5 hours. After allowing to cool, part of the product, 2,4-diamino-5-(5-chloro-2 - methoxy - 4,6 - dimethylbenzyl)pyrimidine, had crystallized (22 g.). The rest (12 g.) was recovered by evaporation of the mother liquor and slurrying the residue with 3 N aqueous sodium hydroxide solution. Recrystallized from alcohol, the product melted at 241–242°.

EXAMPLE 8

Preparation of 2,4-diamino-5-(4,5-dimethoxy-2-methylbenzyl)pyrimidine

Acetylbromothymine (62 g.=0.25 mole), 3,4-dimethoxytoluene (45 g.=0.3 mole), nitrobenzene (50 ml.) were heated under stirring to 70–80°. Mercuric chloride (35 g.=0.125 mole) was added. A reaction started under evolution of heat so that the temperature rose spontaneously to 105–110°. All material went into a clear solution under evolution of hydrogen bromide. The temperature was kept at 105–110° for 5 minutes and then the reaction mixture was allowed to cool. The mercuric complex of the product was decomposed by stirring with a solution of 60 g. of sodium iodide in 300 ml. of 3 N aqueous sodium hydroxide solution and the nitrobenzene removed by ether extraction. The product was precipitated crystalline by the addition of 60 ml. of acetic acid to the aqueous layer. It was filtered by suction, washed with dilute sodium iodide solution and purified by dissolving it in 400 ml. of water and 70 ml. of 3 N aqueous sodium hydroxide solution in the heat, clearing the solution by filtration and reprecipitation with 30 ml. of acetic acid. The yield of 39 g. of 5-(4,5-dimethoxy-2-methylbenzyl)uracil corresponded to 57 percent of the theory. The melting point was 283–284°.

5-(4.5-dimethoxy-2-methylbenzyl)uracil (33 g.=0.115 mole), phosphorous oxychloride (130 ml.), dimethylaniline (2 ml.) were refluxed under stirring for 3 hours. The excess phosphorous oxychloride was distilled off in a vacuum and the syrupy residue slurried with ice water. The product crystallized and was collected by filtration. It was washed on the filter with water and then with a little ice cold alcohol. Recrystallized from ethanol, the product, 2,4-dichloro-5-(4,5-dimethoxy - 2 - methylbenzyl)pyrimidine, melted at 110°. The yield of 29 g. corresponded to 79 percent of the theory.

2,4-dichloro-5-(4,5-dimethoxy-2 - methylbenzyl)pyrimidine (29 g.=0.092 mole) was autoclaved with methanolic ammonia (300 ml. saturated at 0°) at 150–160° for 6 hours. After allowing to cool, the bulk of the product (17 g.) had crystallized and was filtered by suction. A second crop (5 g.) was obtained by evaporation of the mother liquor. The yield of 22 g. corresponded to 86.5 percent of the theory. The melting point was 233°.

To purify the product, 2,4-diamino-5-(4,5-dimethoxy-2-methylbenzyl)pyrimidine, it was dissolved in 150 ml. of hot 20 percent acetic acid, the solution charcoaled and the product precipitated by the addition of an excess 25 percent aqueous sodium hydroxide solution to give white crystals of melting point 230°.

EXAMPLE 9

Preparation of 2,4-diamino-5-(2-ethyl-4,5-dimethoxybenzyl)-pyrimidine

4 - ethylveratrole(1 - ethyl - 3,4 - dimethoxybenzene), 20 g.=0.12 mole, acetylbromothymine, 30 g.=0.12 mole, nitrobenzene, 50 ml. and mercuric chloride, 16.5 g.=0.6 mole were heated on a steambath under exclusion of moisture to 90–100° until the reaction had subsided (15 to 20 minutes). The resulting solution was poured into a solution of sodium iodide, 40 g., in aqueous sodium hydroxide, 300 ml. 3 normal, and the nitrobenzene shaken out repeatedly with benzene. The aqueous layer gave upon neutralization with acetic acid 25 g. (75.5%) of 5-(2-ethyl-4,5-dimethoxybenzyl)uracil of M.P. 219–220°.

5 - (2 - ethyl - 4,5-dimethoxybenzyl)uracil, 21 g.=0.076 mole, phosphorous oxychloride, 84 ml. and dimethylaniline, 1.5 ml. were refluxed under stirring for 4 hours. Excess phosphorous oxychloride was removed by vacuum distillation from a hot water bath and the syrupy residue decomposed with ice water. 2,4-dichloro-5-(2-ethyl-4,5-dimethoxybenzyl)pyrimidine was extracted with ethylacetate and remained as a crystalline residue upon evaporation of the solvent. 20 g. (81%) of recrystallized (methanol) material were obtained of melting point 71–72°.

2,4 - dichloro - 5 - (2 - ethyl - 4,5 - dimethoxybenzyl)-pyrimidine, 20 g. and methanolic ammonia, 300 ml. saturated at 0°, were autoclaved at 140–160° for 6 hours. After allowing to cool, 2,4-diamino-5-(2-ethyl-4,5-dimethoxybenzyl)pyrimidine crystallized in part. The remainder was obtained by evaporation of the mother liquors. Recrystallized from 60% ethanol the product, 2,4 - diamino - 5 - (2 - ethyl - 4,5 - dimethoxybenzyl)-pyrimidine, was obtained in colorless crystals melting at 206–207°.

EXAMPLE 10

Preparation of 2,4-diamino-5-(2-benzyl-4,5-dimethoxybenzyl)pyrimidine 3,4-dimethoxydiphenylmethane [Bercot-Vateroni and Bercot, Compt. Rend. 258:5660 (1964)], 27 g.=0.12 mole, acetylbromothymine, 30 g.=0.12 mole, nitrobenzene, 50 ml., and mercuric chloride, 16.5=0.6 mole were heated on a steam bath under exclusion of moisture to 90–100° for 15 to 20 minutes. Worked up as in the preceding example there was obtained 2,5-(2-benzyl-4,5-dimethoxybenzyl)uracil, 29 g.=69% of the theory, of melting point 238–239°.

5-(2-benzyl - 4,5 - dimethoxybenzyl)uracil, 21 g.=0.06 mole, phosphorous oxychloride, 80 ml., and dimethylaniline, 1.5 ml. were refluxed under stirring for 4 hours. Worked up as described in the preceding example, there is obtained 2,4 - dichloro - 5 - (2 - benzyl - 4,5 - dimethoxybenzyl)pyrimidine of M.P. 108–108.5° in a yield of 21 g.=90%.

2,4 - dichloro - 5 - (2 - benzyl - 4,5 - dimethoxybenzyl)-pyrimidine, 20 g.=0.055 mole were autoclaved with methanolic ammonia, 300 ml. saturated at 0°, at 140–160° for 6 hours. The reaction product, 2,4-diamino-5-(2 - benzyl - 4,5 - dimethoxybenzyl)pyrimidine crystallized upon allowing to cool. Further crops were obtained from the mother liquor by evaporation. It melted at 202–203°.

EXAMPLE 11

Preparation of 2,4-diamino-5-(2,5-dimethyl-4-methoxybenzyl)pyrimidine

Acetylbromothymine, 30 g.=0.12 mole, 2.5-dimethylanisole, 40 g., and anhydrous powdered zinc chloride, 20 g. were heated under stirring to 80° when a spontaneous reaction took place under evolution of hydrogen halogenide. The reaction was terminated by heating on the steam bath at 90–100° for 20 minutes and the homogenous reddish solution poured into aqueous hydrochloric acid, 200 ml., 3 normal. Excess dimethylanisole was recovered by steam distillation, and the crystalline 5-(2,5-dimethyl-4-methoxybenzyl)uracil, 24 g.=77% collected by filtration. Recrystallized from acetic acid it melted at 313–314°.

5-(2,5-dimethyl-4-methoxybenzyl)uracil, 21.5 g.=0.083 mole, phosphorus oxychloride, 80 ml., dimethylanilin 1.5 ml. were refluxed under stirring for 4 hours. Excess phosphorus oxychloride was removed by vacuum distillation from a hot water bath and the syrupy residue decomposed with ice water. The product was extracted with ethyl acetate and after evaporation of the solvent recrystallized from methanol. 2,4-dichloro-5-(2,5-dimethyl-4-methoxybenzyl)pyrimidine was obtained in a yield of 20 g.=88%, melting at 98°.

2,4 - dichloro - 5 - (2,5 - dimethyl - 4 - methoxybenzyl)pyrimidine, 20 g.=0.067 mole, were autoclaved with methanolic ammonia, 300 ml. saturated at 0°, at 140–160° for 6 hours. The reaction product, 2,4-diamino-5-(2,5 - dimethyl - 4 - methoxybenzyl)pyrimidine crystallized upon allowing to cool. M.P. 261°.

I claim:
1. A process for the preparation of a compound of the formula

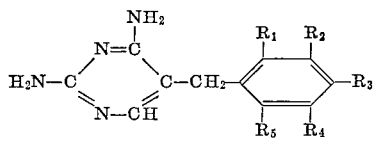

I wherein $R_1$ is selected from the group consisting of halogen, lower alkyl, lower alkoxy, and benzyl, $R_3$ is selected from the group consisting of halogen, lower alkyl, and lower alkoxy, and $R_2$, $R_4$ and $R_5$ are each selected from the group consisting of hydrogen, halogen, lower alkyl, and lower alkoxy, comprising the steps of:
 (a) reacting acetylthymine with N-bromosuccinimide in an organic solvent to form acetylbromothymine;
 (b) reacting acetylbromothymine with a compound of the formula

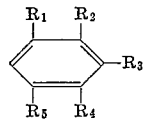

V wherein $R_1$ through $R_5$ have the above meaning, in the presence of a metal halide catalyst selected from the group consisting of mercuric chloride, mercuric bromide, mercuric fluoride, zinc chloride, zinc bromide, zinc fluoride and aluminum chloride, provided that when the compound of Formula V contains one or more lower alkoxy groups, aluminum chloride is not employed, to form a reaction product, and treating the reaction product with an alkali metal hydroxide;
 (c) reacting the treated reaction product with a halogenating agent selected from the group consisting of brominating and chlorinating agents; and
 (d) reacting the product thereof with ammonia to form a compound of Formula I.

2. A process according to claim 1 wherein step (a) is carried out in chloroform solvent, step (b) is carried out with mercuric chloride in nitrobenzene solvent, step (c) is carried out with phosphorus oxychloride, and step (d) is carried out with methanolic ammonia at a temperature in the range of from about 80° to about 200° C.

3. A process according to claim 1 wherein in step (b) the compound of the formula

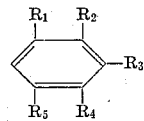

is 1-methyl-3,4-trimethoxybenzene.

4. A compound selected from the group consisting of
 (a) 2,4 - diamino - 5 - (2',4',5'-trichlorobenzyl)pyrimidine, and
 (b) an acid addition salt thereof with a pharmaceutically acceptable acid.

5. A compound selected from the group consisting of
 (a) 2,4 - diamino-5-(4',5'-dimethoxy-2'-methylbenzyl)-pyrimidine, and
 (b) an acid addition salt thereof with a pharmaceutically acceptable acid.
 (b) an acid addition salt thereof with a pharmaceutically acceptable acid.

6. A compound of the formula

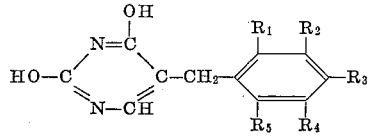

wherein $R_1$ is selected from the group consisting of halogen, lower alkyl, lower alkoxy, and benzyl, $R_3$ is selected from the group consisting of halogen, lower alkyl, and lower alkoxy, and $R_2$, $R_4$ and $R_5$ are each selected from the group consisting of hydrogen, halogen, lower alkyl, and lower alkoxy.

7. A compound of the formula

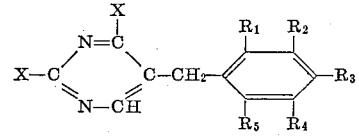

wherein $R_1$ is selected from the group consisting of halogen, lower alkyl, lower alkoxy, and benzyl, $R_3$ is selected from the group consisting of halogen, lower alkyl, and lower alkoxy, and $R_2$, $R_4$ and $R_5$ are each selected from the group consisting of hydrogen, halogen, lower alkyl, and lower alkoxy, and X is selected from the group consisting of chlorine and bromine.

8. A compound of the formula

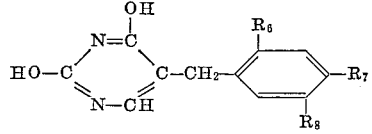

wherein $R_6$, $R_7$, and $R_8$ are each selected from the group consisting of chlorine, bromine, fluorine, lower alkyl, and lower alkoxy.

9. A compound of the formula

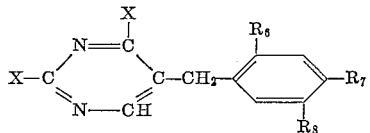

wherein X is selected from the group consisting of chlorine and bromine, and $R_6$, $R_7$ and $R_8$ are each selected from the group consisting of chlorine, bromine, fluorine, lower alkyl, and lower alkoxy.

10. 1 - acetyl - 2,4-diketo-5-bromomethyl-1,2,3,4-tetrahydropyrimidine.

11. 5-(2',4',5'-trimethoxybenzyl)uracil.

12. 2,4-dihalo-5-(2',4',5'-trimethoxybenzyl)pyrimidine.

13. 2,4 - dichloro-5-(2',4',5'-trimethoxybenzyl)pyrimidine.
14. 5-(2',4',5'-trichlorobenzyl)uracil.
15. 2,4-dihalo-5-(2',4',5'-trichlorobenzyl)pyrimidine.
16. 2,4-dichloro-5-(2',4',5'-trichlorobenzyl)pyrimidine.
17. 5-(4',5'-dimethoxy-2'-methylbenzyl)uracil.
18. 2,4 - dihalo - 5-(4',5'-dimethoxy-2'-methylbenzyl)pyrimidine.
19. 2,4 - dichloro-5-(4',5'-dimethoxy-2'-methylbenzyl)pyrimidine.
20. A compound selected from the group consisting of 2,4 - diamino - 5 - (2',4',5'-tri-halobenzyl)pyrimidine, wherein said halo is chlorine, bromine or fluorine, and an acid addition salt thereof with a pharmaceutically acceptable acid.

References Cited

UNITED STATES PATENTS

| | | | |
|---|---|---|---|
| 2,658,897 | 11/1953 | Hitchings et al. | 260—256.4 |
| 2,909,522 | 10/1959 | Hitchings et al. | 260—256.4 |

FOREIGN PATENTS

| | | |
|---|---|---|
| 495M | 3/1961 | France. |
| 734,801 | 3/1963 | Great Britain. |

ALEX MAZEL, Primary Examiner

R. V. RUSH, Assistant Examiner

U.S. Cl. X.R.

260—256.4, 260